United States Patent [19]

Burkhardt

[11] Patent Number: 4,579,219
[45] Date of Patent: Apr. 1, 1986

[54] CONVEYOR CHAIN

[76] Inventor: Volker Burkhardt, Lerchenstrasse 29, 7085 Bopfingen, Fed. Rep. of Germany

[21] Appl. No.: 672,691

[22] Filed: Nov. 19, 1984

[30] Foreign Application Priority Data

Feb. 22, 1984 [DE] Fed. Rep. of Germany ....... 3406352

[51] Int. Cl.[4] .............................................. B65G 39/20
[52] U.S. Cl. .................................. 198/845; 198/853; 474/207
[58] Field of Search ............... 198/817, 779, 838, 845, 198/852, 853; 474/207, 212-217

[56] References Cited

U.S. PATENT DOCUMENTS

| 3,316,771 | 5/1967 | Nichols | 474/212 X |
| 3,605,993 | 9/1971 | Rozario | 198/779 |
| 4,062,444 | 12/1977 | Nakov et al. | 198/838 X |
| 4,469,221 | 9/1984 | Albert | 474/207 X |
| 4,482,061 | 11/1984 | Leverett | 198/779 X |

FOREIGN PATENT DOCUMENTS 8227706  2/1982  Fed. Rep. of Germany .

Primary Examiner—Joseph E. Valenza
Assistant Examiner—Lyle Kim
Attorney, Agent, or Firm—Walter H. Schneider

[57] ABSTRACT

The disclosure relates to a conveyor chain with a plurality of chain rollers, for conveying individual items or similar material handling applications, in which respectively two chain rollers are arranged coaxially at a predetermined distance with respect to one another on a common chain pin in such a way so as to be able to rotate, whereby side bars laterally arranged on the chain pins are used to connect respective sequentially arranged chain rollers, and the individual chain components are adapted to form an endless chain. The chain also includes conveyor rollers on those chain pins which are respectively arranged between two adjacent chain rollers of the chain, and these conveyor rollers have a larger diameter than the chain rollers. Recesslike depressions which are formed between two adjacent conveyor rollers in the chain are filled by bridge-forming space members which are secured on the respective chain pins, or on sleeves. Each space member is made of two components, with the two space member components being arranged in joint-like relation. Respective space member components on the upper side form a bridge part, and crosspieces branch forwardly therefrom in the direction towards the other space member component as well as downwardly into the recess-like depression. The crosspieces of two cooperating space member components engage one another in a manner such as gear teeth meshing in a gear wheel arrangement.

10 Claims, 8 Drawing Figures

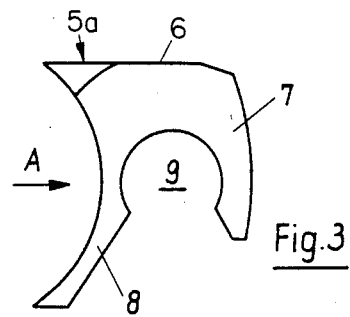
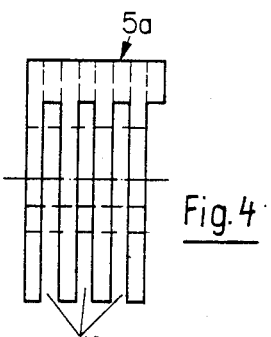
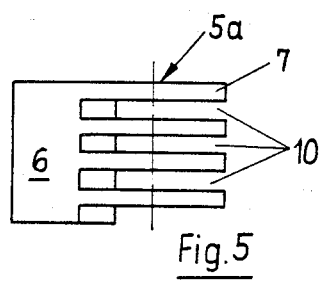
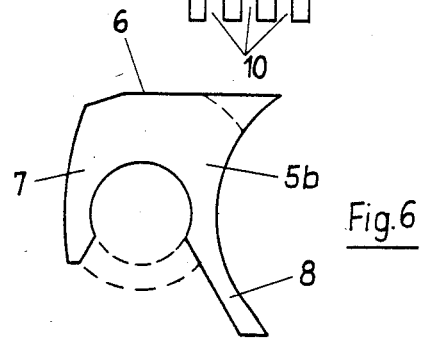
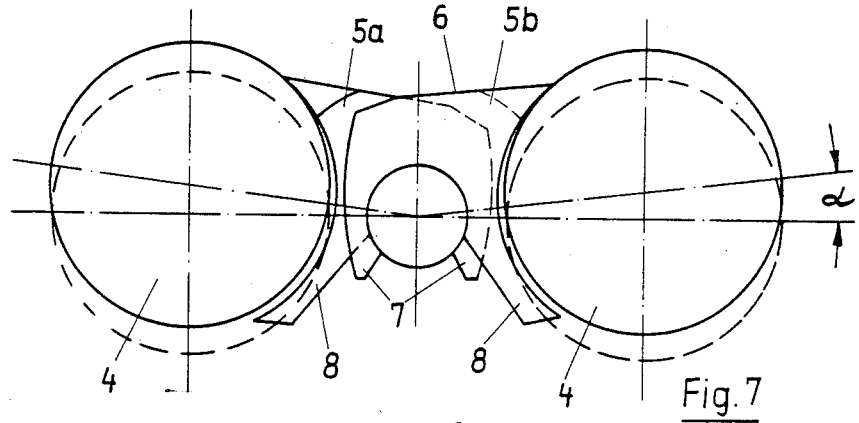
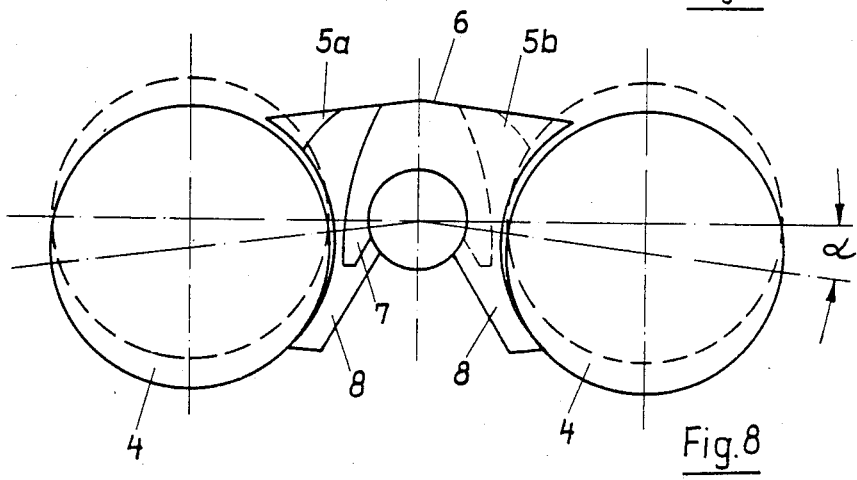

CONVEYOR CHAIN

BACKGROUND OF THE INVENTION

1. Field of the Invention

The present invention relates to improvements in or relating to conveyer chains with a plurality of chain rollers, for conveying individual items or similar material handling applications. Respectively two chain rollers are coaxially arranged at a predetermined distance with respect to one another on a common chain pin in such a way so as to be able to rotate. Side bars are laterally arranged on the chain pins are used to connect respective sequentially arranged chain rollers, and the individual chain components are adapted to form an endless chain in this manner. The conveyer chain also includes conveyer rollers on chain pins, which conveyer rollers are respectively arranged between two coaxial and adjacent chain rollers. These conveyer rollers have a larger diameter than the chain rollers. Recess-like depressions which are formed between two adjacent conveyer rollers in the chain are filled by bridge-forming space members which are secured on the respective chain pins, or on sleeves.

2. Brief Description of the Prior Art

A conveyer chain of this type, also referred to as accumulating conveyer chain or accumulating roller chain, is described, for example, in German Utility Model No. 82 27 706. This type of conveyer chain is guided or supported on runner tracks or similar support members, and usually at least two endless chains are arranged in a frame at a distance and in parallel relation to one another. Such a pair of chains is synchronously driven and conveys on conveyer rollers the material to be moved. The chains are composed of a plurality of individual components, and respectively two adjacent elements form an element pair.

For conveying the material to be moved, the conveyer rollers have a larger diameter than the chain pins and the chain rollers of the chain. The chain rollers are arranged laterally and on the outside of the side bars on the chain pins in coaxial manner and are adapted to traverse on the runner track. Thus, a recess-like depression is formed between a conveyer roller, the next chain pin, or a sleeve mounted on such chain pin, and the next conveyer roller, when viewed in the direction of travel of the chain. Tramp material may fall into such recess-like depressions, and damage may be caused to the entire conveyer arrangement, as well as injuries and, consequently, disruptions of the operations can arise. For example, metallic components can fall into the recess-like depressions, causing an abrupt halt of the conveyer when these components overhang and the material to be moved collides therewith. The chain may consequently break. Furthermore, bearings may break and the entire drive arrangement may be seriously damaged. There furthermore exists the danger of accidents inasmuch that, for example, fingers of operators can inadvertently be inserted into these recesses and this may lead to considerable injuries.

It has been suggested, accordingly, in German Utility Model No. 82 27 706 to install space members or space pieces. These space pieces are placed onto the chain pin, or distance sleeve, respectively, and they cover these recesses in bridge-like manner. Such covering functions properly on straight runs. However, it has been found that lateral gaps are formed between the conveyer rollers and the space pieces at sprocket-wheel turns for the chain. Again, material can drop into such spaces, which subsequently during continued running of the chain in the straight section can also lead to damage due to the closing gaps. It is also of disadvantage in such embodiment that the space pieces of the chain can be diverted only in one direction, because the space pieces would at least nearly completely fill the distance between two conveyer rollers when the chain traverses a straight section. On traversing a turn in upward direction, the distance would be shortened which, however, is not possible due to the presence of the space pieces.

SUMMARY OF THE INVENTION

There has continued to remain, therefore, a need for improving the conveyer chain as briefly described in the foregoing.

It is accordingly an object of the present invention to provide a chain which is improved in its functioning and its safe operation.

It is also an object to provide a conveyer chain which has wider applicability in various material handling problems.

In accordance with one aspect of the invention there is provided, for attainment of the above objects, a conveyer chain in which each space member is made of two components, the two space member components are arranged in joint-like relation, and the space member components respectively form a bridge on the upper side. Crosspieces branch forwardly from the bridge part in the direction towards the other space member component and downwardly into the recess-like depression, and the crosspieces of the two cooperatingly acting space member components engage one another in a manner of teeth meshing with each other in a gear wheel arrangement, for example.

Because the space member is made of two components which are hingedly or joint-like articulated with respect to one another, it is achieved in accordance with one aspect of the invention that the space member components can be adapted to the depression or gap, or the surface-gap, respectively. If now, for example, a turn of the chain over a sprocket wheel in downward direction occurs, with a corresponding increase of the depression, the surface-gap nevertheless remains closed or covered. Although respectively two cooperatingly arranged space member components are moved away fron one another at their upper surface and as a function of the conveyer rollers, which press the downwardly directed crosspieces in a corresponding manner, because the space member components are engaging one another in a meshing relation, a closed bridge is nevertheless at hand. Because of this, small parts can not drop into the recess-like depressions at chain turns.

Because of the joint-like arrangement of the two space member components the conveyer chain can also be deflected or passed around a corresponding sprocket wheel in upward direction, whereby a decrease of the surface-gap occurs. In this case the bilateral crosspieces are moved inwardly with respect to one another. In this manner the number of application possibilities of the conveyer chain in accordance with the present invention is increased and, respectively, the possibilities for various turns.

In accordance with a preferred embodiment the crosspieces surround the pertaining chain pin or distance sleeve, at least by more than half of the circumference of the chain pin, or sleeve, respectively. This provides, accordingly, for a sufficient overlap for the compensation of variations of the surface-gap.

In order to subsequently install the space members without excessive effort into existing material handling arrangements it is preferred that the crosspieces are elastic and are adapted to be slipped over the chain pin, or the sleeve, respectively, in the manner of a snap-on closure.

In installations of new chains the space members can be mounted during the initial assembly on the chain pins or distance sleeves. In this case the crosspieces can be joined to one another in one plane of each space member component, whereby therebetween them a bore is formed having a diameter which is larger by a small dimension than the diameter of the pertaining chain pin, or sleeve, respectively.

In this manner a solid connection is attained between the space members and the pertaining chain pin or distance sleeve.

The number of the crosspieces will be a function of the application at hand, or the width of the conveyer chain. It is preferred, however, to use two to six, for example, four crosspieces. Thus, a comb-like configuration is obtained in which respective crosspieces of the other side mesh with the gaps of the opposite part. As the number of crosspieces is increased the gaps are correspondingly decreased, and the compactness of the bridge is increased even on increase of the surface-gap during a turn of the conveyer chain.

Further embodiments of the invention and other inventive features are contained in the claims.

DESCRIPTION OF THE DRAWINGS

In the drawings, which illustrate that which is presently regarded as the best mode of carrying out the invention.

FIG. 3 is a side elevational view of the left space member component of a space member.

FIG. 4 is a view of the space member according to FIG. 3 in the direction of arrow 'A' therein.

FIG. 5 is top plan view of the space member according to FIG. 3.

FIG. 6 is a side view of the right space member component of a space member.

FIG. 7 is a side elevational view similar to FIG. 2 with a turn of the chain in upward direction.

FIG. 8 is a side elevational view similar to FIG. 2 with a turn of the chain in downward direction.

DESCRIPTION OF THE PREFERRED EMBODIMENTS

Figure 2:
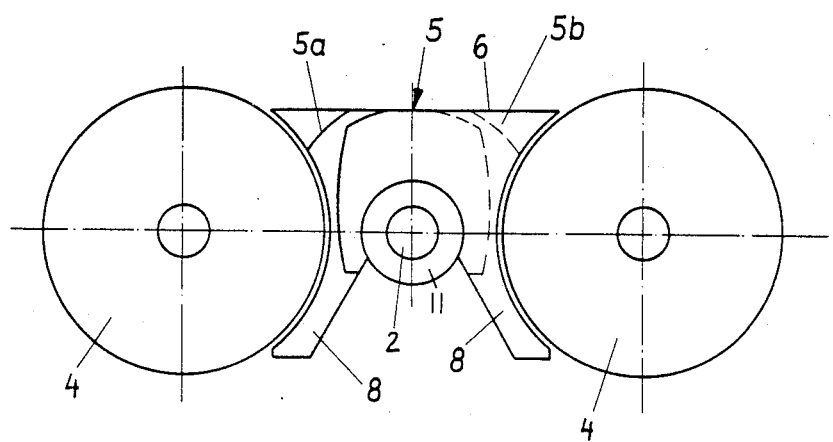
FIG. 2 shows in principle a side elevational view of FIG. 1 without the side bars.

A conveyer chain, also referred to as accumulating chain or accumulating roller chain, is comprised, as is known in the art, of a plurality of chain rollers 1 which are coaxially arranged in pairs on a chain or roller pin 2 so as to be able to rotate. The pins 2 are connected on both sides thereof by side bars 3. Conveyer rollers 4 are arranged between the side bars 3, and such conveyer rollers 4 have a larger diameter than the chain rollers 1. Because of this only each second chain or roller pin 2 is furnished with a conveyer roller 4, whereas the pin therebetween is not furnished with a conveyer roller, but it may be provided with a distance sleeve 11 so that the lateral side bars 3 will be guided without problems. An endless chain can be assembled from the components shown in FIG. 1, which chain is adapted to traverse on a support or runner track, not shown, by means of the chain rollers 1.

Figure 1:
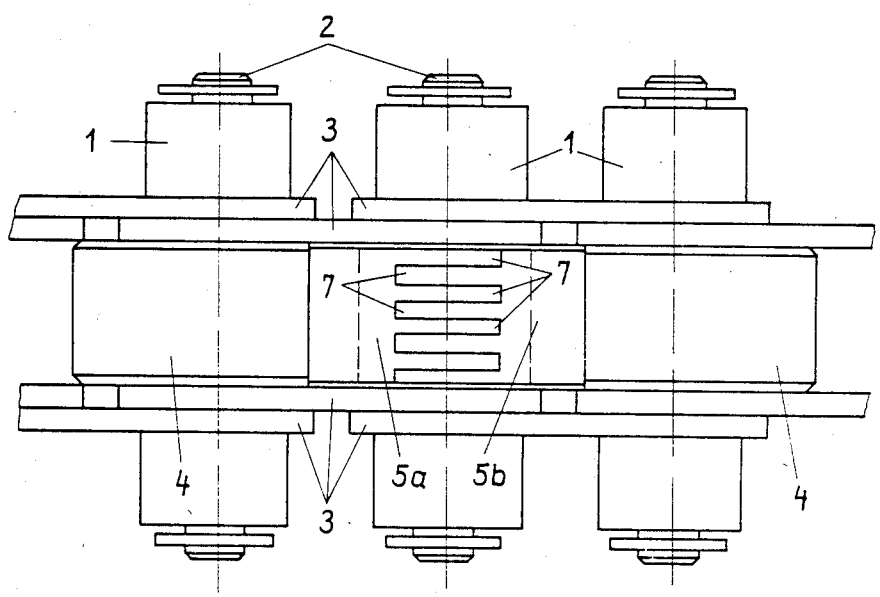
FIG. 1 is a top plan view of part of a conveyer chain with a space member in accordance with one embodiment of the invention.

The recess-like depression or surface-gap between two adjacent conveyer rollers 4 can be bridged, or similarly covered, by a bridge-forming space member 5 which is comprised of two space member components 5a and 5b. The arrangement of the two space member components 5a and 5b is indicated in FIGS. 1 and 2, and their particular structure is shown in FIGS. 3 to 6.

Each space member component 5a and 5b is furnished at its upper side with a bridge part 6 which is generally planar and which in the assembled condition of the chain extends at least nearly substantially parallel with respect to the runner track, not shown. Several crosspieces 7 (four are shown in the drawing) extend in forward direction towards the corresponding counterpart. The crosspieces 7 are bent in downward direction in the forward region. As well, several (again the drawings show four each) crosspieces 8 extend directly in downward direction from the bridge part 6 at the rearward end thereof. The rearward sides of crosspieces 8 are directed towards the conveyer rollers 4 and exhibit a curvature which is larger by a small amount or distance than the radius of curvature of the conveyer rollers 4. The crosspieces are connected in pairs in a single plane in the upper region and have inner sides which define an opening or bore 9 in the lower portion of the crosspieces 7 and 8. The opening 9 is at least nearly substantially corresponding to the diameter of the pins 2, or a distance or space sleeve mounted thereon. The opening 9 is dimensioned such that it surrounds the chain pin 2, or the sleeve, respectively, by slightly more than one-half.

The two space members 5a and 5b are made of an elastic synthetic material, preferably of an injection-molded material, and they are shaped so that they can be mounted on the pin 2, or the sleeve, respectively, in the manner of a snap-on closure. The space member components 5a and 5b are respectively counterparts, i.e., the crosspieces 7 and 8 of one space member component are respectively arranged such that they can be slid into the gaps or comb-like interstices of the pertaining counterpart component. The crosspieces 7 and 8, respectively, of the two space member components 5a and 5b engage one another in the manner of a comb or zipper.

The position which is taken up by the space member components 5a and 5b when the chain is passed through an angle α around a turn in upward direction, is shown in FIG. 7, and the surface-gap of the recess-like depression is correspondingly reduced. In this case, as is clear, the crosspieces 7 are moved inwardly toward each other whereby they reach below the bridge part 6 of the other space member component in the interstices 10. Because of the outer shape of the crosspieces 8 is adapted to the curvature or the diameter of the conveyer rollers 2, the space member components 5a and 5b are moved relative towards one another on bending or buckling of the conveyer rollers 4 because of their contact at these.

FIG. 8 shows the position which is taken up by the space member components 5a and 5b with respect to one another when the chain is passed through an angle α around a turn in downward direction, and when the gap will be inreased. In this case the space member components 5a and 5b again adapt to the increase of the gap. For this the crosspieces 7 emerge further from the recess-like depression, whereby their ends move somewhat away from the pertaining counterpart. Because of this, the gaps 10 between the crosspieces 7 somewhat open in accordance with the angle α, but the resulting gap is rather small in comparison with the full width.

The gaps can be held correspondingly small through a number of crosspieces so that even small tramp items, for example, slit pins or small screws can not drop thereinto.

In general angular changes of up to 8° will be made. However, the space member components 5a and 5b can withstand larger angles.

As is clear from FIGS. 3 and 6, the forwardly directed crosspieces 7 are downwardly bevelled or edged in the forward region thereof on the outer side, so that they can reach more easily underneath the other bridge part 6 into the gaps 10.

The size of the space members is selected in such a way that the surfaces of the bridge part 6 with respect to the running surfaces of the conveyer rollers 4 are disposed somewhat lower, so that the space members 5 do not interfere with the items to be moved by the conveyer.

When the space members 5 are not subsequently to be installed into an existing chain, but when an original production of the chain with the space members 5 in accordance with one aspect of the invention is contemplated, a closed bore can be provided, instead of the opening 9. In such a case the crosspieces 7 and 8 on one plane are also connected to one another in the lowermost region. This embodiment is indicated in dash outline in FIG. 6.

Reference in this disclosure to details of the specific embodiments is not intended to restrict the scope of the appended claims, which themselves recite those features regarded as essential to the invention.

I claim:

1. A conveyer chain for conveying individual items or similar material handling applications, said conveyer chain comprising:

first chain pin assemblies, with each assembly thereof including a chain pin provided with a distance sleeve, and chain rollers arranged coaxially and at a distance with respect to one another on the chain pin in such a way so as to be able to rotate;

second chain pin assemblies, with each assembly thereof including a chain pin, chain rollers arranged coaxially and at a distance with respect to one another on the chain pin in such a way so as to be able to rotate, and at least one conveyer roller arranged coaxially between two chain rollers on the chain pin in such a way so as to be able to rotate;

side bar members for operatively connecting first and second chain pin assemblies in chain sequence, in such a way that a first chain pin assembly is arranged between two second chain pin assemblies in the chain assembly when viewed in the direction of chain travel, and whereby between two second chain pin assemblies recess-like depressions are formed; and for each first chain pin assembly, a space member adapted to act as bridge-forming member, wherein each space member is secured on said chain pin distance sleeve, and wherein each space member includes a first space member component in the form of a forwardly directed crosspiece and a second space member component in the form of a rearwardly directed crosspiece, when viewed in the direction of chain travel, said space member components being arranged in joint-like relation, said space member components respectively on the upper side being adapted to form a bridge part, and said space member components being adapted to engage one another in the manner of teeth meshing with one another in a gear wheel arrangement or, respectively, in zipper-like manner, and wherein each first space member component is adapted to extend forwardly in the direction towards a second space member component and downwardly into a recess-like depression.

2. A conveyor chain according to claim 1 wherein said crosspieces surround said distance sleeve by more than half of the circumference of the sleeve.

3. A conveyer chain according to claim 1 wherein the crosspieces of each space member component of one plane are connected in the lower region to one another in such a manner that therebetween them an opening is formed, said opening having a diameter which is larger by a small dimension than the diameter of said sleeve.

4. A conveyer chain according to claim 1 wherein the forwardly directed crosspieces are flattened in downward direction at least in the forward region.

5. A conveyer chain according to claim 1 wherein the surfaces of the bridge-forming members are disposed somewhat lower than the runner surfaces of the conveyer rollers.

6. A conveyer chain according to claim 1 wherein the downwardly directed crosspieces of pertaining space member components on their sides directed towards pertaining conveyer rollers at least approximately comprise curvatures which correspond to those of the conveyer rollers.

7. A conveyer chain according to claim 1 wherein space member components are made of plastic/synthetic material in such a configuration so as to be adapted to be secured on sleeve, in the manner of a snap-on closure.

8. A conveyer chain according to claim 7 wherein the space member components are made of plastic injection-molded parts.

9. A conveyer chain according to claim 1 wherein each space member component comprises two to six forwardly and downwardly directed crosspieces.

10. A conveyer chain according to claim 9 with four forwardly and downwardly directed crosspieces.

* * * * *